Patented Sept. 7, 1937

2,092,285

UNITED STATES PATENT OFFICE 2,092,285

ENAMEL COMPOSITION AND PROCESS OF MAKING SAME

Dennis A. McKinney, Detroit, Mich., assignor to Ford Motor Company, Detroit, Mich., a corporation of Delaware No Drawing. Application July 10, 1933,
Serial No. 679,718

2 Claims. (Cl. 134—39)

This application relates to a new surface coating so that in construing the following specification one should have certain definitions in mind, as in this field there are so many terms used to refer to such widely different material that otherwise confusion is almost certain. Paint, varnish, japan, lacquer and enamel all cover substances which overlap one another and while paint and varnish are the two most nearly basic terms, enamel could in a broad sense be said to cover all fields. It is in this broad sense that the term enamel is used herein.

My improved enamel, while applicable for use on all surfaces where an enamel is required, is especially adapted for use on automobile bodies where an exceedingly durable and weather-resisting finish is required. To be applicable for automobile use an enamel must withstand the temperate summer and cold winter of Michigan, the dry, hot Imperial Valley of California, and the intense ultra-violet sunshine of Florida. Consequently, an enamel having great durability is required for this use.

A further desirable feature, and one which is not present in enamels now available, is that the gloss of a surface finished with my enamel may be accurately regulated to produce just the desired effect. Other enamels have been produced which dry "flat" but this characteristic was invariably produced at the expense of durability. The reason for desiring a flatter enamel is that a glossy finish magnifies all imperfections in the metal surface, thereby requiring extreme caution in smoothing the surface of the metal. The minute imperfections of the surface are magnified, due to the reflections and high-lights produced. These imperfections are usually ripples in the metal caused by flattening or drawing operations and are difficult to remove because they are not visible until after the enamel has been applied. Reflection from a metal surface may appear perfectly uniform and yet when glossy enamel is applied thereto the slight unevenness of the surface will cause distortion in the reflected light rays which gives the appearance of a rippled surface. This effect is especially noticeable when the glossy surface is viewed at an acute angle, as in looking over the hood of an automobile from the driver's seat. Consequently, a real advantage results from the applicant's enamel because its gloss can be controlled, that is, by the applicant's process the enamels can be made perfectly flat, extremely glossy, or of any degree of flatness therebetween, each of which enamels will have identically the same chemical composition and durability. Thus, the chemical composition may be chosen for its durability and the gloss later controlled by the method of manufacture. This result is believed unique in enamel manufacture and contributes much to the commercial advantage gained by use of the applicant's process.

My improved enamel is based upon the unexpected results which arise when hexahydrophenol is substituted for other ingredients in the paint thinner and when the resin is omitted from the ball mill mix. This feature will be brought out more fully in the specification.

Before contrasting my improved enamel with ordinary enamel, it may be well to briefly describe the steps used in the conventional process of manufacturing enamels. These conventional steps comprise dispersing dry powdered pigment and dry resin into a thinner, this operation being done in a ball mill. The thinner used is invariably a coal tar naphtha, being either xylol, toluol or benzol, however, the term xylol in this specification should be construed as any one of the products of high flash naphtha.

The reason that dry resin is invariably added to the pigment and thinner in the ball mill is that when the pigment alone is dispersed in the thinner two disadvantages result. First, the paste in such case is very unstable, that is, if such paste is allowed to stand even a short while the pigment settles out and hardens into a cake so that the results of the grinding operation are lost, and secondly, xylol being totally absent in lubricating qualities causes the steel balls used in the ball mill to wear away at a high rate of speed so that the iron of the balls mixes with paint and discolors same. Pebbles can be used in place of steel balls but in this case the grinding time is greatly increased. Consequently, a certain percentage of the dry resin is invariably added to the ball mill mix so that the dispersed pigment or paste is viscous enough to retain the pigment in suspension. From the foregoing it will be seen that pigment dispersed in ordinary thinner alone would have no commercial value.

The composition, which is about to be given, is a typical well-known black enamel in which the percentage of pigment in the ball mill mix is maximum, considering the low dispersing power of thinner for carbon black. The percentage of pigment in the finished enamel is not the same, however, as this percentage is derived from durability tests. It should be kept in mind that the proportions of pigment to thinner in the ball mill mix varies for different colors and that the controlling factor in determining the maximum percentage of pigment usable in the ball mill mix is the consistency of the dispersed pigment or the consistency of the mix. A real thin mix, or one having too great a percentage of thinner, is uneconomical, while too thick a mix will make a crumbly mass and will not allow the balls to grind. The importance of maintaining the maximum pigment percentage in the mix is apparent because the grinding operation is long and therefore expensive, requiring from 10 to 100 hours, produces a very glossy finish and the applicant, even after much experimenting, has been unable to reduce the gloss thereof without impairing the durability characteristics of the enamel. Most attempts to reduce the gloss incorporated increases the pigment content. In the above enamel 36% of the ball mill paste is mixed with the resins and thinners to produce the complete enamel. In an attempt to lessen the gloss as high as 70% of the ball mill mix or paste was used, alone cannot be satisfactorily used. However, I have found that by using a certain percentage of hexahydrophenol in place of an equivalent amount of xylol that pigment can be dispersed in this mixture without any resin resulting in a stable paste. The following proportions produce a flat black enamel having identically the same durability as the aforementioned conventional glossy black enamel:

11.5% carbon black  
17.7% hexahydrophenol  } Ball mill mix  
70.8% xylol

36% of the above mixture { 4.14 carbon black  
6.37 hexahydrophenol  
25.2 xylol To the above 36% is added { 32.87 xylol  
31.42 dry resin This gives a composition for the complete enamel as follows:

4.14 pigment  
31.42 dry resin } complete enamel  
64.44 thinner

The pigment, hexahydrophenol and xylol are placed in a ball mill and ground for about the same time as required for the older enamel. All of the dry resin and sufficient thinner to bring the thinner content up to 64.44% is then added. This enamel dries extremely flat but when mixed with conventional enamel any desired gloss may be obtained. It will be noted that the composition of the flat enamel just mentioned is identical to the composition of the glossy type enamel previously described, with the exception that all the thinner element of the older type enamel comprised xylol, while approximately 6% of the thinner element used in the new enamel is hexahydrophenol. It should be kept in mind, however, that hexahydrophenol is a true thinner in that it totally evaporates at the drying temperature of the enamel with no residue remaining, in this respect being identical with xylol. A desirable characteristic of hexahydrophenol is that it has an oily feel, differing radically from the abrasive feel of xylol. Consequently, when the ball mill mix has a material percentage of hexahydrophenol therein the steel balls on the mill do not wear away any faster than if the mix were composed of xylol and dry resin. Thus, the ball wear when grinding my enamel is no better nor worse than with the conventional paste.

To produce an enamel having a medium gloss, I prefer to mix equal parts of the above mentioned flat and glossy enamels. This is conveniently accomplished by mixing equal parts of the two ball mill mixes and then adding sufficient resins and thinners to give a complete enamel of the following composition:

Pigment ----------------------------- 4.14  
Resin ------------------------------- 31.42  
Thinner ----------------------------- 64.44

Other proportions of flat to glossy enamel mixes may be provided when it is desired to decrease or increase the gloss of the enamel. It may, however, be desirable to manufacture both the glossy and flat enamel each with its total resin content and then mix the two enamels together in the desired portion to form the completed enamel. Either way of mixing the enamels produces identical finished enamels.

A very unexpected feature results from the substitution of hexahydrophenol for xylol in that the ball mill paste has unique characteristics.

My flat enamel after having the resin content added has identically the same composition as the aforementioned glossy enamel. However, the ball mill mix is decidedly different in character and appearance from the older ball mill mix. The older ball mill mix has the consistency of strawberry jam, and is somewhat viscous and quite stringy. The ball mill mix of my new enamel has very low viscosity when measured with a McMichael viscosimeter and has a total absence of stringiness. My paste, while not particularly light in weight, still has such a low viscosity that it allows a paint paddle to be moved flatwise therethrough with almost no effort. It resembles in consistency a lime slurry but with a much lower viscosity.

A further very important characteristic of my paste and one wherein it radically differs from other pastes made from pigment and thinner only is that the pigment therein does not settle out upon aging. Experiments and tests have been conducted by the applicant for more than four months, during which time not the slightest settling out of the pigment from the thinner was ascertainable. With all other thinners known to the applicant the pigment would have settled out, unless resin were added, in a matter of a few hours.

A further very important characteristic of my paste and the enamel made therefrom is that livering does not occur therein. The applicant is unaware of the reason for this function, as very little is known about the cause of livering. However, the fact remains that my improved enamel dries flat, does not liver and has a pigment content which has been found most satisfactory for durability.

The advantages gained by the use of my improved enamel and process of manufacturing same comprise:

1. An enamel having the pigment chosen for maximum durability may be made, and the gloss thereof controlled to the exact degree required.

2. Such enamel is less expensive and more durable than enamels wherein an increased pigment content is depended upon to reduce the gloss.

3. Enamels having an increased pigment content readily liver and therefore become worthless as a paint, whereas it is believed that neither the applicant's enamel nor ball mill mix have any tendency whatever to liver.

It should be kept in kind that the substitution of hexahydrophenol for xylol in any proportions in the conventional thinner will not produce a flat paint when ground with the pigment and resin but will on the contrary produce a slight increase over the gloss produced by xylol alone.

Some changes may be made in the composition and sequence of the various steps comprising my improved enamel and process without departing from the spirit of my invention and it is my intention to cover by my claims such changes as may reasonably be included within the scope thereof.

I claim as my invention:

1. The method of manufacturing semi-flat enamel, comprising, dispersing 11.5 parts carbon black and 30.6 parts of dry resin into 57.9 parts xylol in a ball mill, then to 36% of said ball mill mix adding 20.4 parts of resin and 43.6 parts of xylol to produce a glossy enamel composed of 4.14% carbon black, 31.42% dry resin and 64.44% xylol, then dispersing 11.5 parts carbon black into 17.7 parts of hexahydrophenol and 70 parts xylol in a ball mill, and adding to 36% of said last mentioned ball mill mix 32.87% xylol and 31.42% of dry resin to produce a flat enamel having the same proportions of pigment, resin and thinner as said glossy enamel, and then mixing said flat and glossy enamels in half and half proportions to obtain the desired semi-flat enamel.

2. A stable non-viscous and non-livering ball mill paste composed of pigment dispersed in a thinner containing 25% of hexahydrophenol and 75% of xylol.

DENNIS A. McKINNEY.